UNITED STATES PATENT OFFICE.

CHARLES GREEN, OF UXBRIDGE, MASSACHUSETTS, ASSIGNOR TO ALBERT C. WARREN, OF NEWTON, AND GEORGE L. STEVENS, OF BOSTON, MASSACHUSETTS.

COMPOSITION FOR USE IN TREATING TEXTILE FABRICS.

SPECIFICATION forming part of Letters Patent No. 668,011, dated February 12, 1901.

Application filed January 29, 1900. Serial No. 3,131. (No specimens.)

*To all whom it may concern:*

Be it known that I, CHARLES GREEN, a citizen of the United States, residing at Uxbridge, in the county of Worcester and State of Massachusetts, have invented a new and useful Composition for Use in the Treatment of Textile Fabrics, of which the following is a full, clear, and exact description.

The composition comprises a mixture of ingredients having the nature of the following, namely: A chlorid of an alkaline earth—such, for instance, as magnesium or calcium chlorid—a chlorid of sulfate—such, for instance, as sodium or potassium—also chlorid of ammonium or its equivalent and glycerin or its equivalent. I prefer to use of the alkaline earths the chlorid of magnesium and of the alkalies either chlorid or sulfate of potassium or chlorid or sulfate of sodium, or a mixture of both or all.

To make the composition, a chlorid of alkaline earth to the extent of about twenty pounds is intimately mixed with about sixty-five to seventy pounds of chlorid of potassium or chlorid of sodium, about ten pounds of glycerin, and about two pounds of chlorid of ammonium. This makes a very satisfactory composition for many purposes; but the percentages may be varied to any reasonable or desirable extent without departing from the essential spirit of the invention.

The chlorids if dry are dissolved in water, or if in solution water may be added to them. Glycerin is added before or at the time the composition is used.

The fabric to be treated is saturated with the solution and its fibers and threads caused to absorb the same. The surplus solution is removed from the fabric by pressure or by an extractor and the fabric then dyed. Cloth thus treated is improved in appearance and body, the composition having the effect of fulling, filling, closing, and softening the same and also giving a brightness and life to the finish.

Having thus fully described my invention, I claim and desire to secure by Letters Patent of the United States—

A composition for the treatment of textile fabrics, the same consisting of a chlorid of an alkaline earth, a chlorid of an alkali, chlorid of ammonium and glycerin in about the proportions stated and for the purposes set forth.

CHARLES GREEN.

Witnesses:
    F. F. RAYMOND, 2d,
    M. E. FLAHERTY.